US008983220B2

(12) United States Patent
Lee et al.

(10) Patent No.: US 8,983,220 B2
(45) Date of Patent: Mar. 17, 2015

(54) ERROR DIFFUSION METHOD AND LIQUID CRYSTAL DISPLAY USING THE SAME

(75) Inventors: Junghwan Lee, Paju-si (KR); Sihoon Lee, Incheon (KR); Kyungjoon Kwon, Seoul (KR); Byoungchul Cho, Seoul (KR)

(73) Assignee: LG Display Co., Ltd, Seoul (KR)

( * ) Notice: Subject to any disclaimer, the term of this patent is extended or adjusted under 35 U.S.C. 154(b) by 569 days.

(21) Appl. No.: 12/770,395

(22) Filed: Apr. 29, 2010

(65) Prior Publication Data

US 2011/0123129 A1 May 26, 2011

(30) Foreign Application Priority Data

Nov. 23, 2009 (KR) ........................ 10-2009-0113140

(51) Int. Cl.
*G06K 9/00* (2006.01)
*G09G 3/00* (2006.01)
*G09G 3/20* (2006.01)
*G09G 3/34* (2006.01)

(52) U.S. Cl.
CPC ............ *G09G 3/2051* (2013.01); *G09G 3/2059* (2013.01); *G09G 3/3426* (2013.01); *G09G 2320/0646* (2013.01); *G09G 2360/16* (2013.01)
USPC ............................ 382/252; 345/102; 345/616

(58) Field of Classification Search
None
See application file for complete search history.

(56) References Cited

U.S. PATENT DOCUMENTS 4,733,230 A * 3/1988 Kurihara et al. .............. 345/589
5,553,165 A * 9/1996 Webb et al. ................... 382/252
5,604,605 A * 2/1997 Moolenaar ................... 358/3.03
5,844,532 A * 12/1998 Silverbrook et al. ........... 345/89
5,892,851 A * 4/1999 Nguyen ........................ 382/252
5,974,228 A * 10/1999 Heitsch .......................... 358/1.9
6,307,978 B1 * 10/2001 Metaxas ....................... 382/252
6,417,835 B1 * 7/2002 Otobe et al. .................. 345/690
6,556,214 B1 * 4/2003 Yamada et al. ............... 345/616
6,870,641 B2 * 3/2005 Kakutani ...................... 358/3.03
7,196,821 B2 * 3/2007 Kakutani ...................... 358/3.03
7,460,275 B2 * 12/2008 Kempf ......................... 358/3.03
7,639,887 B2 * 12/2009 Roberts ......................... 382/252
7,705,802 B2 * 4/2010 Park ................................ 345/60
2002/0135595 A1 9/2002 Morita et al.
2004/0257623 A1 12/2004 Suzuki
2005/0063607 A1 * 3/2005 Park .............................. 382/261
2009/0102850 A1 4/2009 Liang et al.
2010/0091045 A1 * 4/2010 Heidrich et al. .............. 345/690
2011/0141077 A1 * 6/2011 Cho et al. ...................... 345/207

OTHER PUBLICATIONS

Seetzen et al. (May 2003) "A high dynamic range display using low and high resolution modulators." SID Symp. Digest of Technical Papers, vol. 34 No. 1, pp. 1450-1453.*
Seetzen et al. (Aug. 2004) "High Dynamic Range Display Systems." Proc. ACM SIGGRAPH 2004, ACM Trans. on Graphics, vol. 23 No. 3, pp. 760-768.*

* cited by examiner

*Primary Examiner* — Barry Drennan
(74) *Attorney, Agent, or Firm* — McKenna Long & Aldridge LLP

(57) ABSTRACT

An error diffusion method includes: simultaneously receiving first to nth (n is a positive integer of 2 or larger) pixel data at every clock; adding a quantization error stored in a memory to each of the first to (n−1)th pixel data and quantizing them into data having a smaller number of bits than the number of input bits; adding the quantization error stored in the memory to the nth pixel data and quantizing it into data having a smaller number of bits than the number of input bits; diffusing the quantization errors of the first to (n−1)th pixel data to nearby pixels excluding the first to nth pixels by using a first error diffusion mask, and storing the diffusion results of the quantization errors of the first to (n−1)th pixel data in the memory; and diffusing the quantization error of the nth pixel data to pixels around the nth pixel by using a second error diffusion mask, and storing the diffusion results of the quantization error of the nth pixel data in the memory.

10 Claims, 8 Drawing Sheets

ERROR DIFFUSION METHOD AND LIQUID CRYSTAL DISPLAY USING THE SAME

This nonprovisional application claims priority under 35 U.S.C. §119(a) on Patent Application No. 10-2009-0113140 filed in Republic of Korea on Nov. 23, 2009 the entire contents of which are hereby incorporated by reference.

BACKGROUND

1. Field of the Invention

This document relates to an error diffusion method and a liquid crystal display (LCD) using the same.

2. Discussion of the Related Art

A liquid crystal display (LCD) has the characteristics of being light and thin and driven with low power consumption, so its application coverage is extending. A transmission type LCD, which is the most common LCD, displays an image by modulating light made incident from a backlight unit by controlling an electric field applied to a liquid crystal layer.

A quantization error may be generated in a process of quantizing pixel data of the LCD. An error diffusion method is performed to diffuse a quantization error, which is generated in the quantization process, to pixels which have not been quantized yet among other pixels therearound, to spread the quantization error. A phenomenon that quantization errors collectively appear at portions can be prevented by using the error diffusion method.

Distortion in the form of a contour that may appear in correcting pixel data in the LCD is generated as the portions having a great deal of quantization errors linearly gather. Such linear distortion can be improved by using a method of diffusing a quantization error to nearby pixels, as a quantization method.

In the error diffusion method, the quantization error of pixel data is diffused to nearby pixels by shifting an error diffusion mask as shown in FIG. 1 according to a quantization processing order by using such a method as shown in FIG. 2. The quantization error generated from pixel data which is being currently quantized is diffused to the nearby pixels suitably according to the form and size of a mask as shown in FIG. 1. An error diffusion coefficient of the error diffusion mask illustrated in FIG. 1 is a Floyd-Steinberg error diffusion coefficient.

The error diffusion method requires processing results of previous pixel data in processing the pixel data being currently quantized. Thus, quantization of pixels must be sequentially performed.

When image data inputted to an image display device includes only one pixel data at every clock through one port input, there is no problem with application of the error diffusion method. However, if two or more pixel data are simultaneously inputted to the LCD at every clock through two ports or n number of port input terminals (n is a positive integer larger than 2), two or more of pixel data are simultaneously quantized at every clock. Thus, the related art error diffusion method can be applicable for only one port input, not for the n number of port inputs.

The recent LCD has improved contrast through a local dimming method in which an input image is analyzed and light sources are turned on by blocks. In the local dimming method, a backlight is divided into a plurality of blocks, and the luminance of the blocks where an image is brighter in the backlight is increased while the luminance of the blocks where an image is relatively dark in the backlight is lowered. Because the light sources are turned on by the blocks, namely, partially turned on, the luminance of the backlight employing the local dimming method is lower than the luminance of a backlight in which the entire light sources are turned on without using local dimming. Thus, in order to compensate the low backlight luminance of the local dimming method, pixel data may be compensated for. In this case, however, light density of the backlight has an analog level (infinite resolution), while the pixel data is digital data having a determined bit width, so when the pixel data is compensated for in case of local dimming, a quantization error may be generated. Thus, an error diffusion method needs to be applied in case of compensating for the pixel data in case of local dimming.

SUMMARY OF THE INVENTION

An aspect of this document is to provide an error diffusion method capable of simultaneously diffusing quantization errors of n number of pixel data, and a liquid crystal display (LCD) using the same.

In an aspect, an error diffusion method comprises: simultaneously receiving first to nth (n is a positive integer of 2 or larger) pixel data at every clock; adding a quantization error stored in a memory to each of the first to (n−1)th pixel data and quantizing them into data having a smaller number of bits than the number of input bits; adding the quantization error stored in the memory to the nth pixel data and quantizing it into data having a smaller number of bits than the number of input bits; diffusing the quantization errors of the first to (n−1)th pixel data to nearby pixels excluding the first to nth pixels by using a first error diffusion mask, and storing the diffusion results of the quantization errors of the first to (n−1) th pixel data in the memory; and diffusing the quantization error of the nth pixel data to pixels around the nth pixel by using a second error diffusion mask, and storing the diffusion results of the quantization error of the nth pixel data in the memory.

In another aspect, a liquid crystal display (LCD) comprises: n number of port input terminals configured to simultaneously receive first to nth pixel data (n is a positive integer of 2 or larger) at every clock; a first quantization processing unit configured to add a quantization error stored in a memory to each of the first to (n−1)th pixel data, and quantize them into data having a smaller number of bits than that of input bits; a second quantization processing unit configured to add the quantization error stored in the memory to the nth pixel data and quantize it into data having a smaller number of bits than that of input bits; a first error diffusion processing unit configured to diffuse quantization errors of the first to (n−1)th pixel data to nearby pixels excluding the first to nth pixels by using a first error diffusion mask, and storing diffusion results of the quantization errors of the first to (n−1)th pixel data in the memory; and a second error diffusion processing unit configured to diffuse a quantization error of the nth pixel data to pixels around the nth pixel by using a second error diffusion mask, and storing diffusion results of the quantization error of the nth pixel data in the memory.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
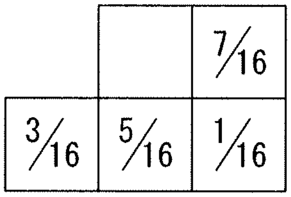
FIG. 1 (RELATED ART)
FIG. 1 illustrates the related art error diffusion mask.
Figure 2:
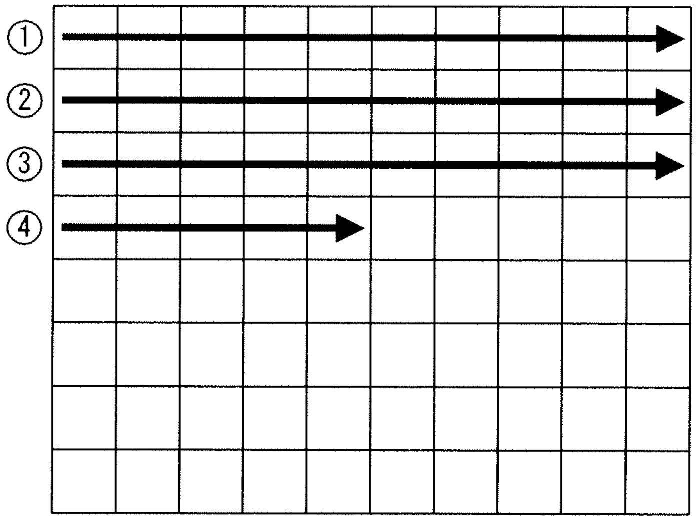
FIG. 2 (RELATED ART)
FIG. 2 illustrates the order of proceeding with quantization.
Figure 3:
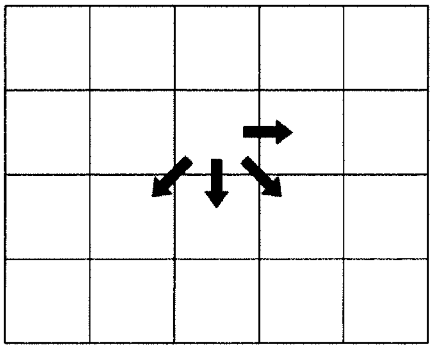
FIG. 3 (RELATED ART)
FIG. 3 illustrates a diffusion of a quantization error by using an error diffusion mask.

Hereinafter, an implementation of this document will be described in detail with reference to the attached drawings. The same reference numerals will be used throughout to designate the same or like components. In describing the present invention, if a detailed explanation for a related known function or construction is considered to unnecessarily divert the gist of the present invention, such explanation will be omitted but would be understood by those skilled in the art.

The names of elements used in the following description are simply selected in consideration of easiness of describing the specification and may be different from names of the components of an actual product.

With reference to FIGS. 4 to 7, an error diffusion unit 100 according to an exemplary embodiment of the present invention includes a first quantization processing unit 101, a first error diffusion processing unit 102, a second quantization processing unit 104, a second error diffusion processing unit 105, and a memory 103.

The first quantization processing unit 101 is connected with first to (n−1)th port input terminals. The first quantization processing unit 101 simultaneously receives first to (n−1)th pixel data through the first to (n−1)th port input terminals at every clock and quantizes them. The number of bits of each of the input pixel data of the first quantization processing unit 101 is greater than that of data obtained after quantization error diffusion. The first quantization processing unit 101 adds a quantization error of previous pixel data stored in the memory 103 to the currently inputted pixel data, and then quantizes it such that it has the level of the number of bits obtained after the error diffusion. The first quantization processing unit 101 outputs the quantized pixel data (R'G'B') through an output terminal, and outputs the quantization errors generated during the quantization process to the first error diffusion processing unit 102.

Figure 5:
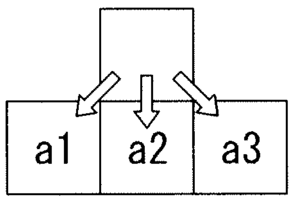
FIG. 5 illustrates an example of a first error diffusion mask applied to a first error diffusion processing unit illustrated in FIG. 4.
Figure 7:
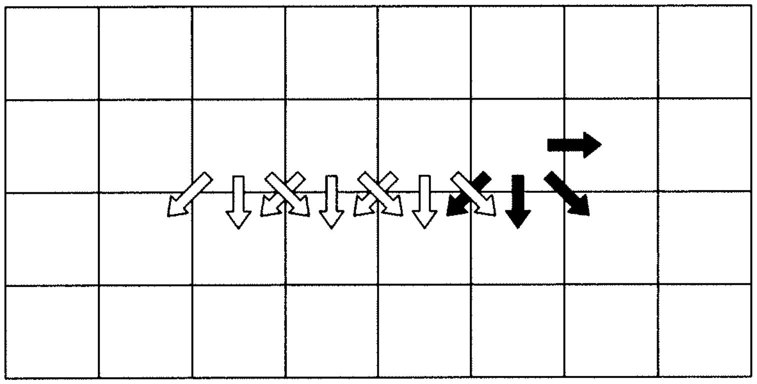
FIG. 7 illustrates quantization of four pixel data simultaneously inputted through a four-port input terminals and the proceeding order of a quantization error diffusion.
Figure 8:
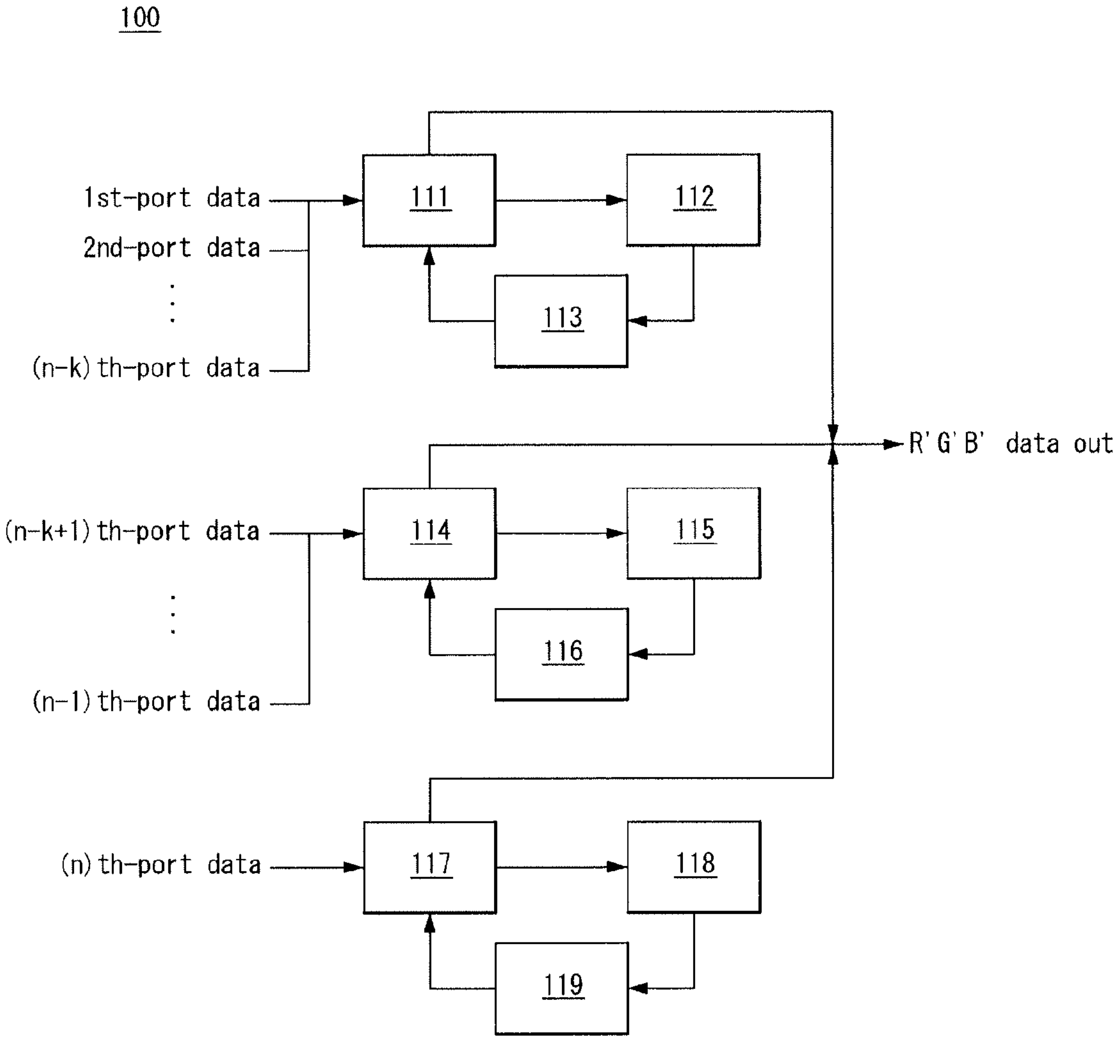
FIG. 8 illustrates an error diffusion unit according to another exemplary embodiment of the present invention.

The first error diffusion processing unit 102 is connected between the first quantization processing unit 101 and the memory 103. The first error diffusion processing unit 102 diffuses the quantization errors of the first to (n−1)th pixel data to nearby pixels at a next line which have not been quantized yet as shown in FIG. 7 by using a first error diffusion mask as shown in FIG. 5. Namely, the first error diffusion processing unit 102 diffuses the quantization errors of the first to (n−1)th pixel data to the nearby pixels excluding the first to nth pixels. In this case, the first error diffusion mask must not cause an influence between the simultaneously quantized pixel data. To this end, the first error diffusion mask comprises first to third error diffusion coefficients a1 to a3 to be diffused only to the nearby pixels at the next line which have not been quantized yet. The first error diffusion coefficient a1 is an error diffusion coefficient diffused to a pixel positioned at a left side in a diagonal direction of the current pixel at the next line positioned below the current line to which the current pixel to be error-diffused belongs. The second error diffusion coefficient a2 is an error diffusion coefficient diffused to a pixel positioned below the current pixel at the next line. The third error diffusion coefficient a3 is an error diffusion coefficient diffused to a pixel positioned at a right side in a diagonal direction of the current pixel at the next line. The first error diffusion coefficient a1 may be set to be $3/16$, the second error diffusion coefficient a2 may be set to be $4/16$, and the third error diffusion coefficient a3 may be set to be $1/16$. The processing results of the first error diffusion processing unit 102 are stored as quantization error values of the previous pixel data in the memory 103.

The second quantization processing unit 104 is connected with nth port input terminal. The second quantization processing unit 104 quantizes nth pixel data inputted through the nth port input terminal. The number of bits of inputted pixel data of the second quantization processing unit 104 is greater than that of data obtained after quantization error diffusion. The second quantization processing unit 104 adds a quantization error of previous pixel data stored in the memory 103 to the currently inputted pixel data, and quantizes it such that it has the level of the number of bits obtained after the error diffusion. The second quantization processing unit 104 outputs the quantized pixel data (R'G'B') through an output terminal, and outputs the quantization errors generated during the quantization process to the second error diffusion processing unit 105.

Figure 6:
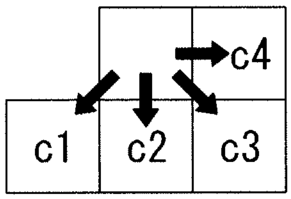
FIG. 6 illustrates an example of a second error diffusion mask applied to a second error diffusion processing unit illustrated in FIG. 4.

The second error diffusion processing unit 105 is connected between the second quantization processing unit 104 and the memory 103. The second error diffusion processing unit 105 diffuses the quantization errors of the nth pixel data to nearby pixels at a current line and a next line which have not been quantized yet as shown in FIG. 7 by using a second error diffusion mask as shown in FIG. 6. Namely, the second error diffusion processing unit 105 diffuses the quantization errors of the nth pixel data to the nearby pixels around the nth pixel by using the second error diffusion mask. The second error diffusion mask comprises first to fourth error diffusion coefficients c1 to c4 to be diffused to nearby pixels at the current line and the next line which have not been quantized yet. The first error diffusion coefficient c1 is an error diffusion coefficient diffused to a pixel positioned at a left side in a diagonal direction of the current pixel at the next line. The second error diffusion coefficient c2 is an error diffusion coefficient diffused to a pixel positioned below the current pixel at the next line. The third error diffusion coefficient c3 is an error diffusion coefficient diffused to a pixel positioned at a right side in a diagonal direction of the current pixel at the next line. The fourth error diffusion coefficient c4 is an error diffusion coefficient diffused to the (n+1)th pixel contiguous to the right side of the current pixel at the current line. The first error diffusion coefficient c1 may be set to be 3/16, the second error diffusion coefficient c2 may be set to be 5/16, the third error diffusion coefficient c3 may be set to be 1/16, and the fourth error diffusion coefficient c4 may be set to be 7/16. The processing results of the second error diffusion processing unit 105 are stored as quantization error values of the previous pixel data in the memory 103.

The memory 103 stores the quantization error diffusion results of the error-diffused previous pixel data, and transmits the corresponding data to the first and second quantization processing units 101 and 104.

Figure 4:
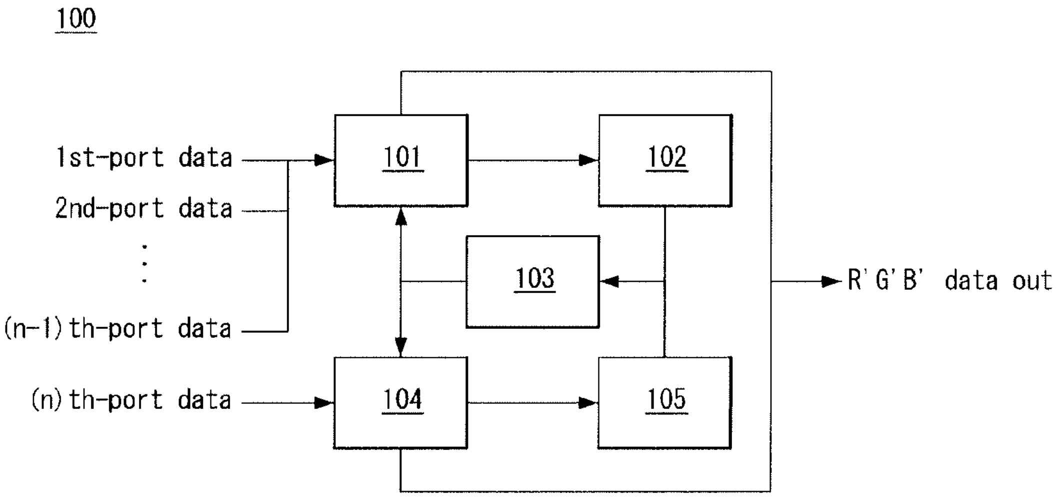
FIG. 4 illustrates an error diffusion unit according to an exemplary embodiment of the present invention.

In the error diffusion method illustrated in FIGS. 4 to 6, quantization errors of the (n−1) number of inputs and the nth input are diffused by using the different types of error diffusion masks with respect to the nth port input which receives n number of pixel data at every clock. In FIG. 7, white arrows indicate quantization errors diffused through the first error diffusion mask, and black arrows indicate quantization errors diffused through the second error diffusion mask.

When the quantity of light of each pixel is calculated in order to compensate for pixel data in case of local dimming, the quantity of light varies according to a screen position like a black gray level screen image, so the same gray levels may be calculated to be different gray levels, causing a gray level step in the same gray level screen image. According to experimentation results employing the error diffusion according to an exemplary embodiment of the present invention, the phenomenon that a gray level step appears at the same gray level can be improved by the quantization error diffusion effect.

As described above, the error diffusion method according to an exemplary embodiment of the present invention has the advantage in that the pixel data simultaneously inputted through the n number of port input terminals can be simultaneously quantized by using two or more error diffusion masks, and the quantization error can be diffused to the nearby pixels.

FIGS. 8 to 12 illustrate an error diffusion unit 100 according to another exemplary embodiment of the present invention.

With reference to FIGS. 8 to 12, the error diffusion unit 100 according to the present exemplary embodiment includes a first quantization processing unit 111, a first error diffusion processing unit 112, a first memory 113, a second quantization processing unit 114, a second error diffusion processing unit 115, a second memory 116, a third quantization processing unit 117, a third error diffusion processing unit 118, and a third memory 119.

The first quantization processing unit 111 is connected with first to (n-k)th port input terminals (k is a positive integer smaller than n). The first quantization processing unit 111 simultaneously receives first to (n-k)th pixel data through the first to (n-k)th port input terminals at every clock and quantizes them. The number of bits of each of the input pixel data of the first quantization processing unit 111 is greater than that of data obtained after quantization error diffusion. The first quantization processing unit 111 adds a quantization error of previous pixel data stored in the first memory 113 to the currently inputted pixel data, and then quantizes it such that it has the level of the number of bits obtained after the error diffusion. The first quantization processing unit 111 outputs the quantized pixel data (R'G'B') through an output terminal, and outputs the quantization errors generated during the quantization process to the first error diffusion processing unit 112.

Figure 9:
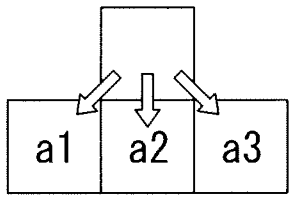
FIG. 9 illustrates an example of (1-1)th error diffusion mask applied to a first error diffusion processing unit illustrated in FIG. 8.
Figure 12:
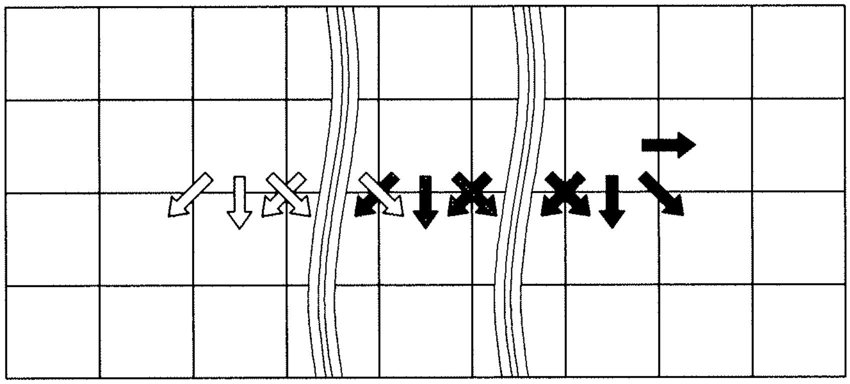
FIG. 12 illustrates quantization of four pixel data simultaneously inputted through a five-port input terminals and the proceeding order of a quantization error diffusion.

The first error diffusion processing unit 112 is connected between the first quantization processing unit 111 and the first memory 113. The first error diffusion processing unit 112 diffuses the quantization errors of the first to (n-k)th pixel data to nearby pixels at a next line which have not been quantized yet as shown in FIG. 12 by using a (1-1)th error diffusion mask as shown in FIG. 9. In this case, the (1-1)th error diffusion mask must not cause an influence between the simultaneously quantized pixel data. To this end, the (1-1)th error diffusion mask comprises first to third error diffusion coefficients a1 to a3 to be diffused only to the nearby pixels at the next line which have not been quantized yet. The first error diffusion coefficient a1 is an error diffusion coefficient diffused to a pixel positioned at a left side in a diagonal direction of the current pixel at the next line positioned below the current line to which the current pixel to be error-diffused belongs. The second error diffusion coefficient a2 is an error diffusion coefficient diffused to a pixel positioned below the current pixel at the next line. The third error diffusion coefficient a3 is an error diffusion coefficient diffused to a pixel positioned at a right side in a diagonal direction of the current pixel at the next line.

The first memory 113 stores the quantization error diffusion result of the previous pixel data which has been error-diffused by the first error diffusion processing unit 112, and transmits the corresponding data to the first quantization processing unit 111.

The second quantization processing unit 114 is connected with (n-k+1)th to (n−1)th port input terminals. The second quantization processing unit 114 simultaneously receives (n-k+1)th to (n−1)th pixel data through the (n-k+1)th to (n−1)th port input terminals at every clock and quantizes them. The number of bits of each of the input pixel data of the second quantization processing unit 114 is greater than that of data obtained after quantization error diffusion. The second quantization processing unit 114 adds a quantization error of previous pixel data stored in the second memory 116 to the currently inputted pixel data, and then quantizes it such that it has the level of the number of bits obtained after the error diffusion. The second quantization processing unit 114 outputs the quantized pixel data (R'G'B') through an output terminal, and outputs the quantization errors generated during the quantization process to the second error diffusion processing unit 115.

Figure 10:
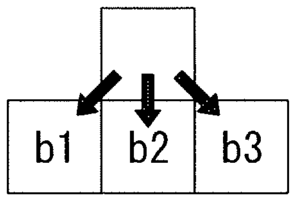
FIG. 10 illustrates an example of (1-2)th error diffusion mask applied to a second error diffusion processing unit illustrated in FIG. 8.

The second error diffusion processing unit 115 is connected between the second quantization processing unit 114 and the second memory 116. The second error diffusion processing unit 115 diffuses the quantization errors of the (n-k+1)th to (n−1)th pixel data to nearby pixels at a next line which have not been quantized yet as shown in FIG. 12 by using a (1-2)th error diffusion mask as shown in FIG. 10. In this case, the (1-2)th error diffusion mask must not cause an influence between the simultaneously quantized pixel data. To this end, the (1-2)th error diffusion mask comprises first to third error diffusion coefficients b1 to b3 to be diffused only to the nearby pixels at the next line which have not been quantized yet. The first error diffusion coefficient b1 is an error diffusion coefficient diffused to a pixel positioned at a left side in a diagonal direction of the current pixel at the next line positioned below the current line to which the current pixel to be error-diffused belongs. The second error diffusion coefficient b2 is an error diffusion coefficient diffused to a pixel positioned below the current pixel at the next line. The third error diffusion coefficient b3 is an error diffusion coefficient diffused to a pixel positioned at a right side in a diagonal direction of the current pixel at the next line.

The second memory 116 stores the quantization error diffusion result of the previous pixel data which has been error-diffused by the second error diffusion processing unit 115, and transmits the corresponding data to the second quantization processing unit 114.

The third quantization processing unit 117 is connected with nth port input terminal. The third quantization processing unit 117 quantizes nth pixel data inputted through the nth port input terminal. The number of bits of inputted pixel data of the third quantization processing unit 117 is greater than that of data obtained after quantization error diffusion. The third quantization processing unit 117 adds a quantization error of previous pixel data stored in the third memory 119 to the currently inputted pixel data, and quantizes it such that it has the level of the number of bits obtained after the error diffusion. The third quantization processing unit 117 outputs the quantized pixel data (R'G'B') through an output terminal, and outputs the quantization errors generated during the quantization process to the third error diffusion processing unit 118.

Figure 11:
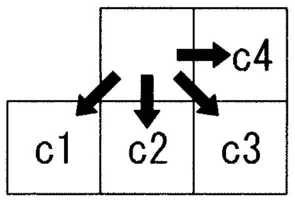
FIG. 11 illustrates an example of a second error diffusion mask applied to a third error diffusion processing unit illustrated in FIG. 8.

The third error diffusion processing unit 118 is connected between the third quantization processing unit 117 and the third memory 119. The third error diffusion processing unit 118 diffuses the quantization errors of the nth pixel data to nearby pixels at a current line and a next line which have not been quantized yet as shown in FIG. 12 by using a second error diffusion mask as shown in FIG. 11. The second error diffusion mask comprises first to fourth error diffusion coefficients c1 to c4 to be diffused to nearby pixels at the current line and the next line which have not been quantized yet. The first error diffusion coefficient c1 is an error diffusion coefficient diffused to a pixel positioned at a left side in a diagonal direction of the current pixel at the next line. The second error diffusion coefficient c2 is an error diffusion coefficient diffused to a pixel positioned below the current pixel at the next line. The third error diffusion coefficient c3 is an error diffusion coefficient diffused to a pixel positioned at a right side in a diagonal direction of the current pixel at the next line. The fourth error diffusion coefficient c4 is an error diffusion coefficient diffused to the (n+1)th pixel contiguous to the right side of the current pixel at the current line.

The third memory 119 stores the quantization error diffusion results of the error-diffused previous pixel data, and transmits the corresponding data to the third quantization processing unit 119.

Figure 13:
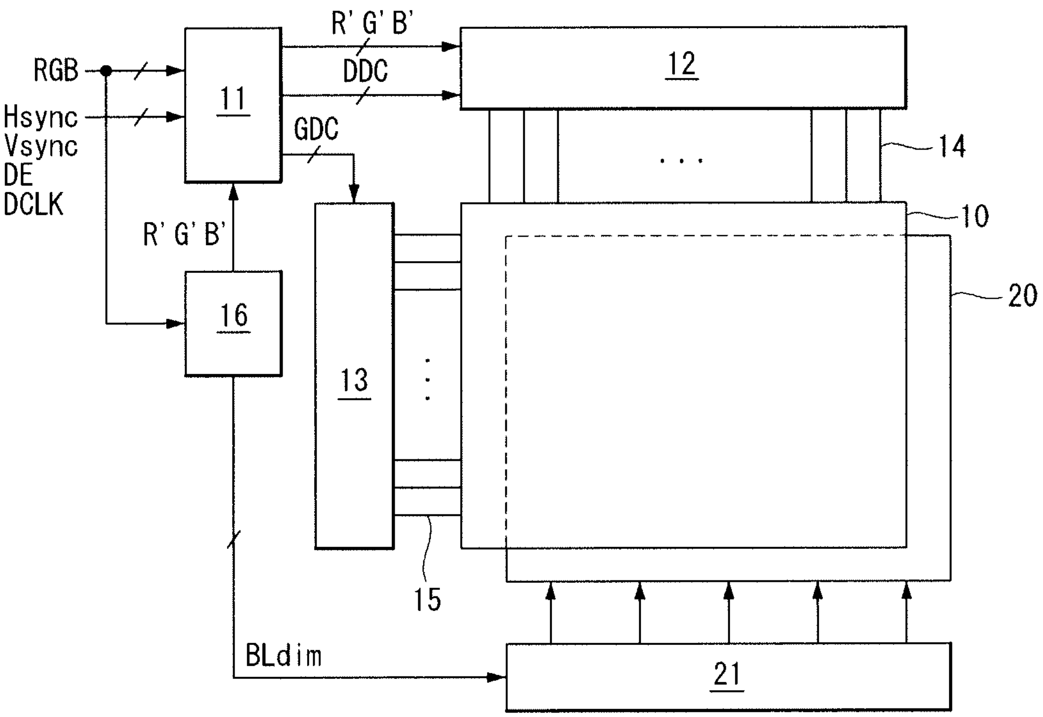
FIG. 13 is a schematic block diagram of a liquid crystal display (LCD) according to an exemplary embodiment of the present invention.
Figure 14:
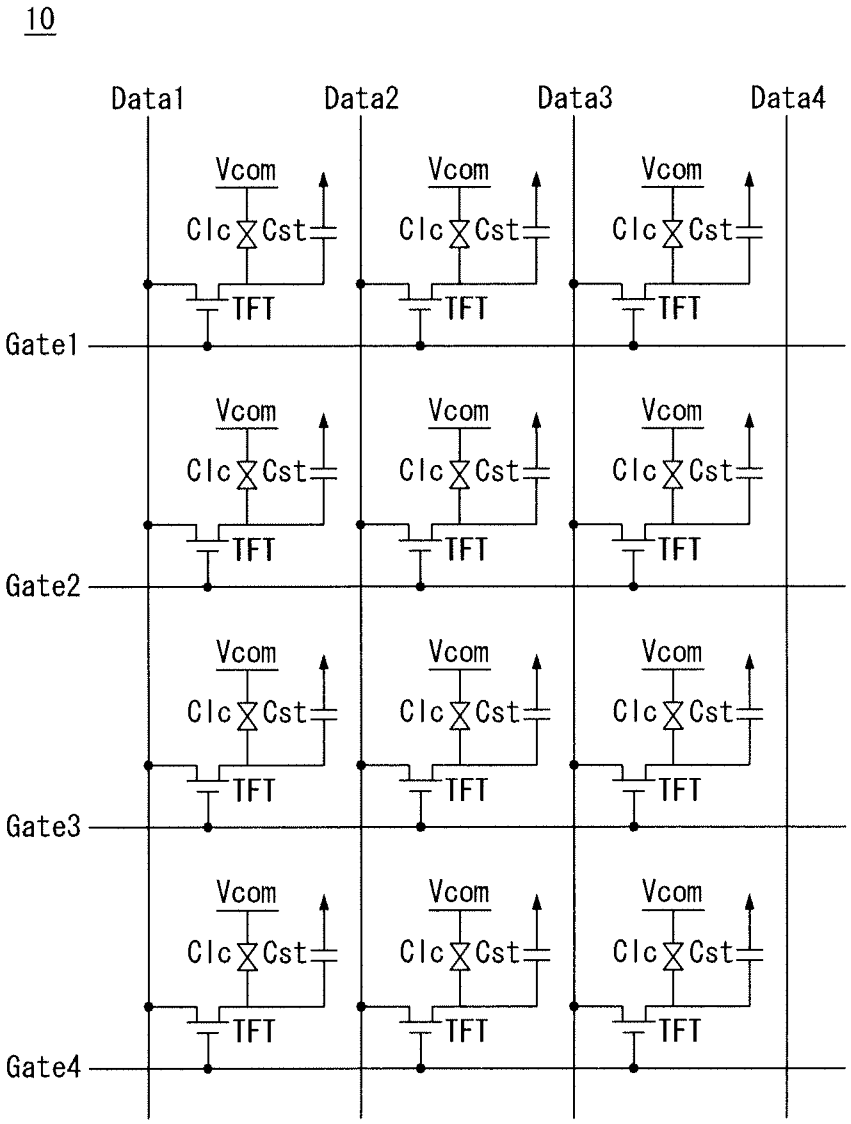
FIG. 14 is an equivalent circuit diagram showing a portion of a pixel array of a liquid crystal panel illustrated in FIG. 13.
Figure 15:
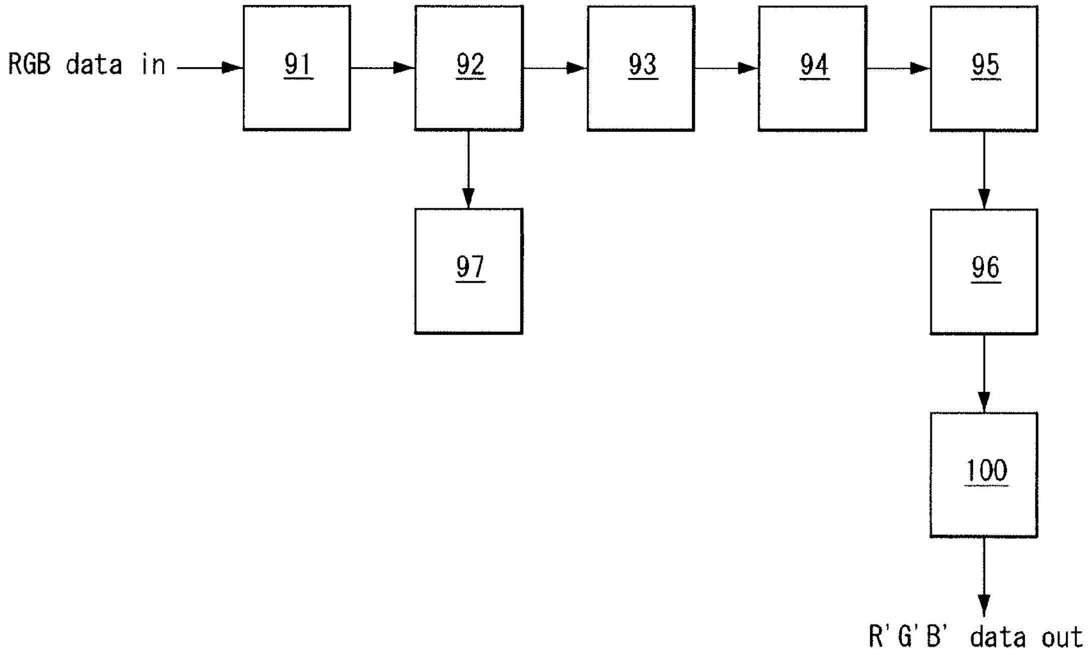
FIG. 15 is a detailed block diagram of a local dimming controller illustrated in FIG. 13.

FIGS. 13 to 15 illustrate a liquid crystal display (LCD) according to an exemplary embodiment of the present invention.

With reference to FIGS. 13 to 15, the LCD according to an exemplary embodiment of the present invention includes a liquid crystal panel 10, a source driving unit 12 for driving data lines 14 of the liquid crystal panel 10, a gate driving unit 13 for driving gate lines 15 of the liquid crystal panel 10, a timing controller 11 for controlling the source driving unit 12 and the gate driving unit 13, a backlight unit 20 for irradiating light to the liquid crystal panel 10, a light source driving unit 21 for driving light sources of the backlight unit 20, an a local dimming controller 16 for controlling local dimming.

The liquid crystal panel 10 comprises a liquid crystal layer formed between two glass substrates. A plurality of data lines 14 and a plurality of gate lines 15 cross on a lower glass substrate of the liquid crystal panel 10. Liquid crystal cells Clc are disposed in a matrix form on the liquid crystal panel 10 according to the crossing structure of the gate lines 14 and the gate lines 15. On the lower glass substrate of the liquid crystal panel 10, the data lines 14, the gate lines 15, thin film transistors (TFTs), pixel electrodes of the liquid crystal cells Clc connected with the TFTs, storage capacitors Cst, and the like are formed.

Black matrixes, color filters, and a common electrode are formed on an upper glass substrate of the liquid crystal panel 10. In a vertical field driving mode such as a twisted nematic (TN) mode and a vertical alignment (VA) mode, the common electrode is formed on the upper glass substrate, and in a horizontal field driving mode such as an in-plane switching (IPS) mode and a fringe field switching (FFS) mode, the common electrode is formed together with pixel electrodes on the lower glass substrate. Polarizers are attached to the upper and lower glass substrates of the liquid crystal panel 10, and an alignment film for setting a pre-tilt angle of liquid crystal is formed at an inner surface in contact with liquid crystal.

The pixel array of the liquid crystal panel 10 and a light emission surface of the backlight unit 20 facing the pixel array are virtually divided into a plurality of blocks for a local dimming. Each block includes i×j number of pixels (i and j are positive integers of 2 or larger) and a backlight light emission surface irradiating light to the pixels. Each pixel includes subpixels of the three primary colors, and the subpixels include liquid crystal cells (Clc).

The timing controller 11 supplies digital video data (RGB) to the source driving unit 12 upon receiving timing signals Vsync, Hsync, DE, DCLK from an external system board. The timing signals include a vertical synchronization signal Vsync, a horizontal synchronization signal Hsync, a data enable signal DE, a dot clock signal DCLK, and the like. The timing controller 11 generates timing control signals DDC and GDC for controlling an operation timing of the source driving unit 12 and the gate driving unit 13 based on the timing signals Vsync, Hsync, DE, DCLK transferred from the external system board. The system board or the timing controller 11 may insert an interpolation frame between frames of an input image signal inputted at a frame frequency of 60 Hz and multiply the source timing control signal DDC and the gate timing control signal GDC by N(N is a positive integer of 2 or larger) to control the operation of the source driving unit 12 and the gate driving unit 13 at a frame frequency of 60×N Hz.

The timing controller 11 supplies the digital video data (RGB) of the input image inputted from the external system board to the local dimming controller 16 and supplies digital video data (R'G'B') which has been modulated by the local dimming controller 16 to the source driving unit 12.

The source driving unit 12 latches the digital video data (R'G'B') under the control of the timing controller 11. The source driving unit 12 then converts the digital video data (R'G'B') into a positive polarity/negative polarity analog data voltage by using a positive polarity/negative polarity gamma compensation voltage and supplies the same to the data lines 14.

The gate driving unit 13 includes a shift register, a level shifter for converting an output signal from the shift register into a signal having a swing width suitable for TFTs driving of the liquid crystal cells, an output buffer, and the like. The gate driving unit 13, configured to have a plurality of gate drive integrated circuits (ICs), sequentially outputs gate pulses (or scan pulses) having a pulse width of substantially one horizontal period. The gate pulses are sequentially supplied to the gate lines 15 in synchronization with a data voltage supplied to the data lines 14.

The backlight unit 20 is disposed below the liquid crystal panel 10. The backlight unit, comprising a plurality of light sources separately controlled by the blocks by the light source driving unit 21, irradiates uniform light to the liquid crystal panel 10. The backlight unit 20 may be implemented as a direct type backlight unit or an edge type backlight unit. The light source of the backlight unit 20 may include one or two or more of HCFL (Hot Cathode Fluorescent Lamp), CCFL (Cold Cathode Fluorescent Lamp), EEFL (External Electrode Fluorescent Lamp), and LED (Light Emitting Diode).

The light source driving unit 21 separately controls the light sources of the backlight unit 20 by the blocks according to a pulse width modulation (PWM) signal having a duty ratio varying according to a dimming value (BLdim) inputted from the local dimming controller 16. The pulse width modulation (PWM) signal controls a ratio of turn-on and turn-off of the light sources, and the duty ratio (%) is determined according to the dimming value (BLdim) outputted from the local dimming controller 16.

The local dimming controller 16 analyzes the digital video data (RGB) inputted from the timing controller 11 by the blocks to calculate a representative value of each block. The representative value of each block may be calculated as an average value or an average picture level (APL) of an input image. The average value of the input image is an average value of the highest values among the RGB values of pixels, and the average picture level (APL) is an average value of the luminance values (Y) of the pixels. The local dimming controller 16 maps the representative values of the respective blocks to a pre-set dimming curve to output the dimming value (BLdim) of each block of the backlight unit 20, and modulates the digital video data (RGB) inputted from the timing controller 11 to compensate for pixel data to be displayed on the liquid crystal panel 10. The local dimming controller 16 codes the dimming value (BLdim) of each block into data of a serial peripheral interface (SPI) format and supplies the same to a micro control unit (MCU) of the light source driving unit 21.

FIG. 15 is a detailed block diagram of the local dimming controller 16.

With reference to FIG. 15, the local dimming controller 16 includes a representative value calculation unit 91, a local dimming value selection unit 92, a block selecting unit 93, a light quantity analyzing unit 94, a gain calculation unit 95, a data compensation unit 96, an error diffusion unit 100, and a light source controller 97.

The representative value calculation unit 91 divides input image data into blocks and calculates a representative value of each block.

The local dimming value calculation unit 92 maps the representative value of each block to a pre-set dimming curve and selects a dimming value (BLdim) of each block. The local dimming value selection unit 92 outputs the dimming value (BLdim) to the light source controller 97 and the block selection unit 93. The local dimming value selection unit 92 may select the dimming value (BLdim) of each block by using a look-up table. The local dimming value selection unit 92 may select the dimming value (BLdim) of each block mapped to a representative value of each block from the dimming curve previously stored upon receiving the representative values of the blocks in the look-up table.

The block selection unit 93 selects an analysis area of a certain size by using the dimming value (BLdim) of each block inputted from the local dimming value selection unit 92. The light quantity analyzing unit 94 calculates a total quantity of light of each pixel by using the dimming values of the selected analysis area.

The gain calculation unit 95 calculates the gain of each pixel. The gain is calculated as the ratio between the quantity of light of the pixels when all the light sources of the backlight unit 20 are turned on as full white (or the maximum brightness) and the quantity of light of the pixels calculated through an optical profile in case of local dimming. Namely, the gain G is calculated as G=Knormal/Klocal. Here, Knormal is a constant value indicating the quantity of light when local dimming is not performed, and Klocal is a variable value indicating the quantity of light of a particular block according to the dimming value (BLdim) of each block when local dimming is performed. The data compensation unit 96 compensates for pixel data by modulating data by multiplying the gain to the original pixel data.

The error diffusion unit 100 is connected to the data compensation unit 96 through the n number of port input terminals. The error diffusion unit 100 quantizes n number of pixel data which are simultaneously inputted through n number of port input terminals, and diffuses an error generated during the quantization process to nearby pixels by using two or more error diffusion masks.

The light source controller 97 codes the dimming value (BLdim) of each block inputted from the local dimming value selection unit 92 into data of an SPI format, and supplies the same to the light source driving unit 21.

As described above, in the exemplary embodiment of the present invention, the quantization errors of first to (n−1)th pixel data are diffused to the nearby pixels by using the first error diffusion mask that does not cause an influence on the simultaneously quantized data, and the quantization error of the nth pixel data is diffused to the pixels around the nth pixel positioned at the current line and the next line by using the second error diffusion mask. As a result, the quantization errors of the n number of pixel data can be simultaneously diffused.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An error diffusion method comprising:

receiving original pixel data for a block of pixels, determining a gain of each pixel based on a ratio in quantity of light of the block of pixels depending on whether or not a local dimming is performed, and modulating each original pixel data based on the gain of each pixel;

simultaneously receiving first to nth (n is a positive integer of 2 or larger) pixel data of the modulated pixel data that include an error of quantization relating to the local dimming applied to the block of pixels at every clock;

adding a quantization error of previous pixel data stored in a memory to each of the currently inputted first to (n−1)th pixel data and quantizing them into data having a smaller number of bits than the number of input bits;

adding the quantization error of previous pixel data stored in the memory to the currently inputted nth pixel data and quantizing it into data having a smaller number of bits than the number of input bits;

diffusing the quantization errors of the first to (n−1)th pixel data to nearby pixels excluding the first to nth pixels by using a first error diffusion mask, and storing the diffusion results of the quantization errors of the first to (n−1)th pixel data in the memory; and diffusing the quantization error of the nth pixel data to pixels around the nth pixel by using a second error diffusion mask, and storing the diffusion results of the quantization error of the nth pixel data in the memory, wherein the first to nth pixel data are simultaneously quantized by using the first error diffusion mask and the second error diffusion mask.

2. The method of claim 1, wherein the first error diffusion mask diffuses the quantization errors of the first to (n−1)th pixel data to nearby pixels positioned in the next line of a current line to which the first to nth pixels belong.

3. The method of claim 2, wherein the second error diffusion mask diffuses the quantization error of the nth pixel data to the pixels around the nth pixel positioned in the current line and in the next line.

4. A liquid crystal display (LCD) comprises:

a local dimming controller that receives original pixel data for a block of pixels, determines a gain of each pixel based on a ratio in quantity of light of the block of pixels depending on whether or not a local dimming is performed, and modulates each original pixel data according to the gain of each pixel;

n number of port input terminals configured to simultaneously receive first to nth pixel data of the modulated pixel data (n is a positive integer of 2 or larger) that include an error of quantization relating to the local dimming applied to the block of pixels at every clock;

a first quantization processing unit configured to add a quantization error of previous pixel data stored in a memory to each of the currently inputted first to (n−1)th pixel data, and quantize them into data having a smaller number of bits than that of input bits;

a second quantization processing unit configured to add the quantization error of previous pixel data stored in the memory to the currently inputted nth pixel data and quantize it into data having a smaller number of bits than that of input bits;

a first error diffusion processing unit configured to diffuse quantization errors of the first to (n−1)th pixel data to nearby pixels excluding the first to nth pixels by using a first error diffusion mask, and storing diffusion results of the quantization errors of the first to (n−1)th pixel data in the memory; and a second error diffusion processing unit configured to diffuse a quantization error of the nth pixel data to pixels around the nth pixel by using a second error diffusion mask, and storing diffusion results of the quantization error of the nth pixel data in the memory, wherein the first to nth pixel data are simultaneously quantized by using the first error diffusion mask and the second error diffusion mask.

5. The LCD of claim 4, wherein the first error diffusion mask diffuses the quantization errors of the first to (n−1)th pixel data to nearby pixels positioned in the next line of a current line to which the first to nth pixels belong.

6. The LCD of claim 5, wherein the second error diffusion mask diffuses the quantization error of the nth pixel data to the pixels around the nth pixel positioned in the current line and in the next line.

7. An error diffusion method comprising:

receiving original pixel data for a block of pixels, determining a gain of each pixel based on a ratio in quantity of light of the block of pixels depending on whether or not a local dimming is performed, and modulating each original pixel data based on the gain of each pixel, simultaneously receiving first to nth (n is a positive integer of 2 or larger) pixel data of the modulated pixel data that include an error of quantization relating to the local dimming applied to the block of pixels at every clock;

adding a quantization error of previous pixel data stored in a memory to each of the currently inputted first to (n−k)th (k is a positive integer of 2 or larger, but smaller than n) pixel data and quantizing them into data having a smaller number of bits than the number of input bits;

adding a quantization error of previous pixel data stored in a memory to each of the currently inputted (n−k+1)th to (n−1)th pixel data and quantizing them into data having a smaller number of bits than the number of input bits;

adding the quantization error of previous pixel data stored in the memory to the currently inputted nth pixel data and quantizing it into data having a smaller number of bits than the number of input bits;

diffusing the quantization errors of the first to (n−k)th pixel data to nearby pixels excluding the first to nth pixels by using a first error diffusion mask, and storing the diffusion results of the quantization errors of the first to (n−k)th pixel data in the memory;

diffusing the quantization errors of the (n−k+1)th to (n−1)th pixel data to nearby pixels excluding the first to nth pixels by using a third error diffusion mask, and storing the diffusion results of the quantization errors of the (n−k+1)th to (n−1)th pixel data in the memory; and diffusing the quantization error of the nth pixel data to pixels around the nth pixel by using a second error diffusion mask, and storing the diffusion results of the quantization error of the nth pixel data in the memory, wherein the first to nth pixel data are simultaneously quantized by using the first error diffusion mask, the third error diffusion mask and the second error diffusion mask.

8. The method of claim 7, wherein the first error diffusion mask diffuses the quantization errors of the first to (n−k)th pixel data to nearby pixels positioned in the next line of a current line to which the first to nth pixels belong.

9. The method of claim 8, wherein the third error diffusion mask diffuses the quantization errors of the (n−k+1)th to (n−1)th pixel data to nearby pixels positioned in the next line of a current line to which the first to nth pixels belong.

10. The method of claim 9, wherein the second error diffusion mask diffuses the quantization error of the nth pixel data to the pixels around the nth pixel positioned in the current line and in the next line.

* * * * *